United States Patent
Corbitt

[15] 3,658,144
[45] Apr. 25, 1972

[54] WEIGHT PLATFORM APPARATUS IN A WEIGHING MACHINE

[72] Inventor: John Bruce Corbitt, 4231 S. W. 32nd Street, Hollywood, Fla. 33023

[22] Filed: Mar. 23, 1970

[21] Appl. No.: 21,685

[52] U.S. Cl. .................................. 177/258, 177/DIG. 9
[51] Int. Cl. ..................................................... G01g 21/08
[58] Field of Search .................. 177/253, 256, 258, DIG. 9

[56] References Cited

UNITED STATES PATENTS

| 24,162 | 5/1859 | Strong at al. | 177/DIG. 9 |
| 1,759,884 | 5/1930 | Bousfield | 177/DIG. 9 |
| 3,358,785 | 12/1967 | Mayer et al. | 177/256 |

FOREIGN PATENTS OR APPLICATIONS

| 1,953 | 6/1869 | Great Britain | 177/256 |

Primary Examiner—Stephen J. Tomsky
Assistant Examiner—George H. Miller, Jr.
Attorney—John Cyril Malloy

[57] ABSTRACT

Weighbridge or weight platform structure particularly useful in medium and heavy-duty platform type scales or weighing machines. The weight or load-receiving apparatus is operative through compound lever means for actuating typical weight counterbalancing and indicating elements in a weighing machine. The compound lever means includes a primary lever construction preferably arranged centrally of the weight platform structure and includes a pair of secondary lever constructions arranged oppositely symmetrically of the primary lever construction and coactingly operative therewith. The weight platform apparatus includes a plurality of support pedestal units supportingly interposed between the load-receiving platform structure and the secondary lever constructions, and includes an improved knife edge support means at the respective load arm and force arm fulcrum and load pivot areas of the apparatus, which are adjustable to restore the scale to sensitive response after a period of use in the field, for long term accurate and sensitive operation within accepted limits of precision.

12 Claims, 8 Drawing Figures

INVENTOR.
JOHN BRUCE CORBITT
BY John Cyril Malloy
ATTORNEY.

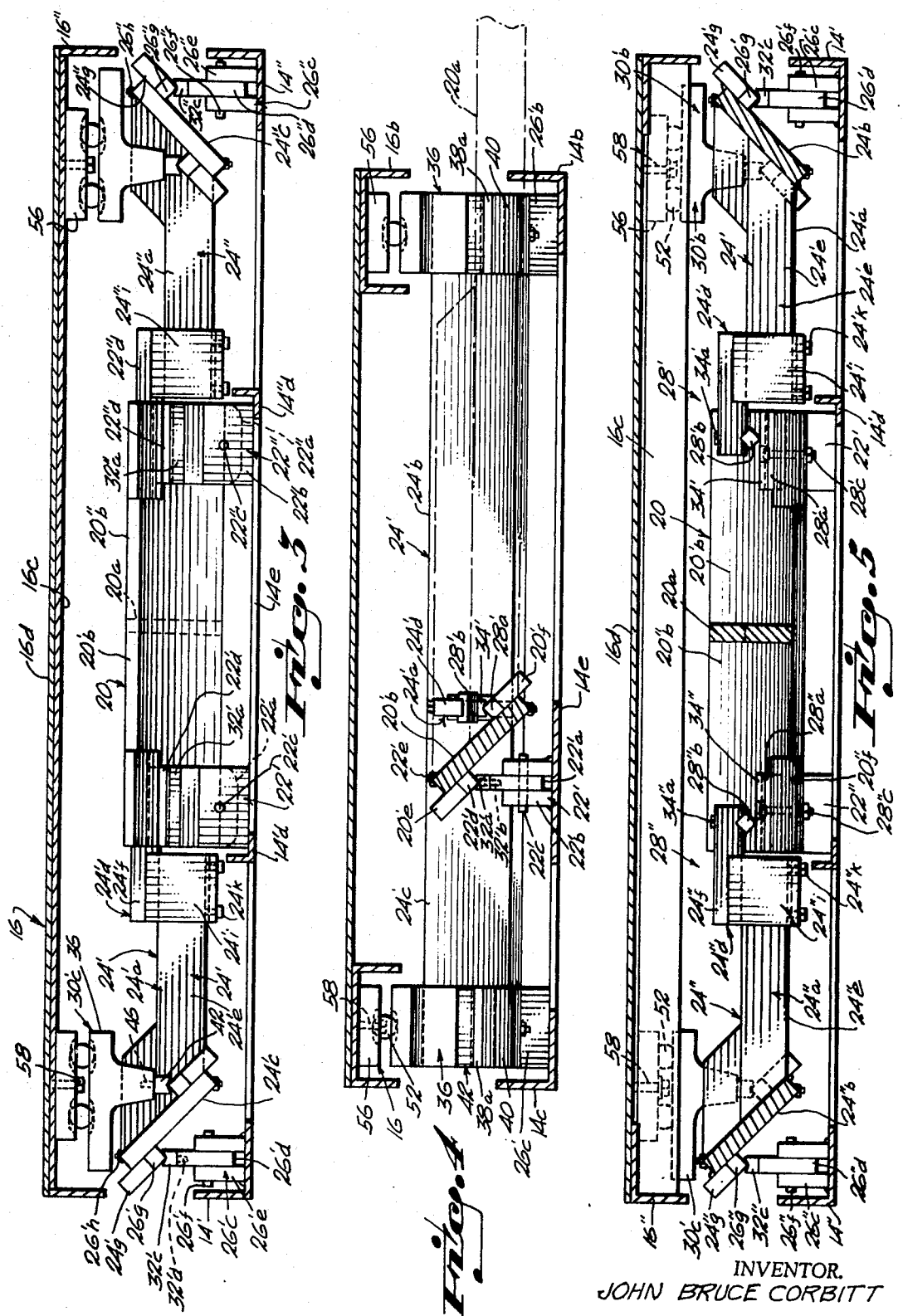

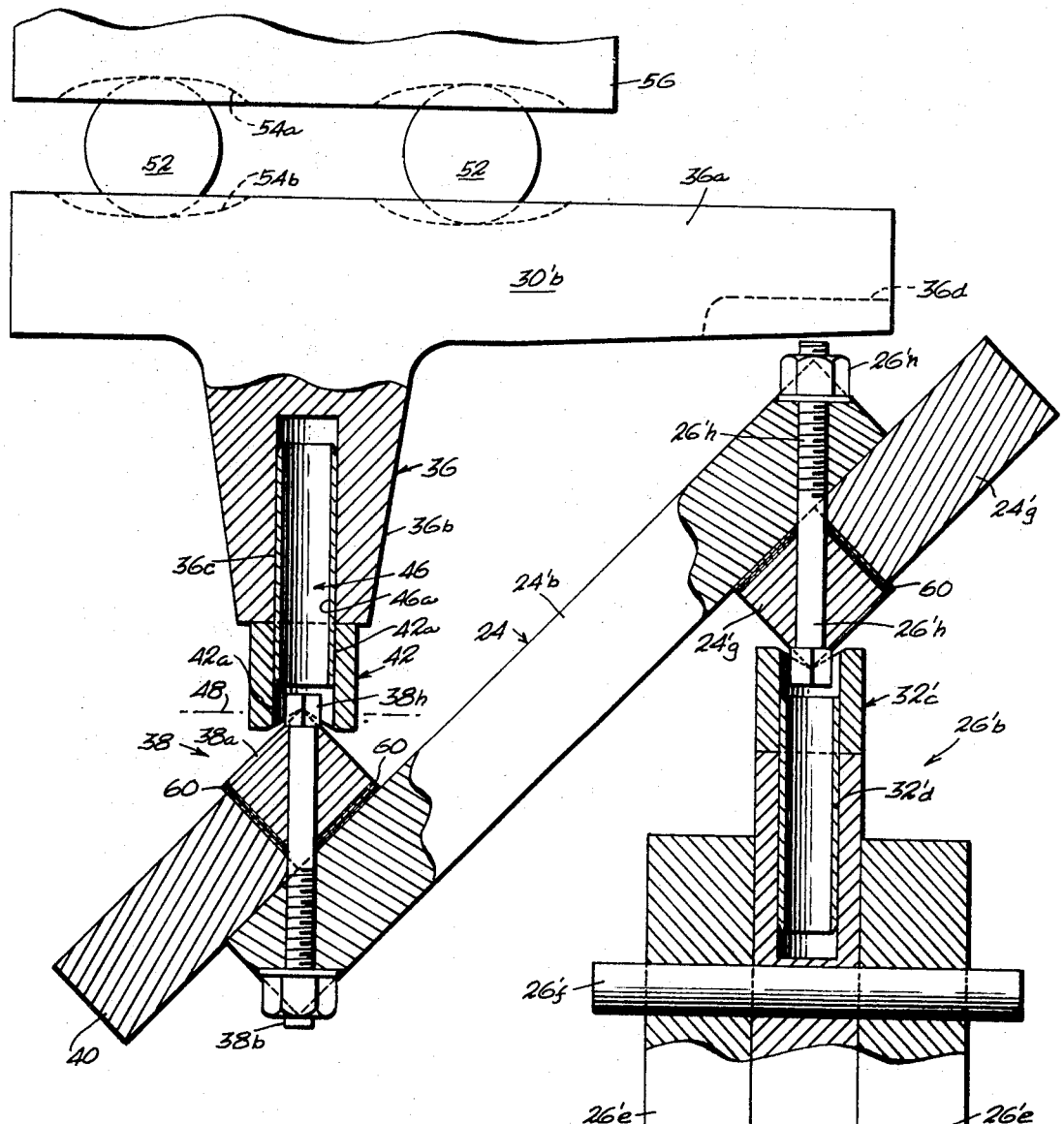
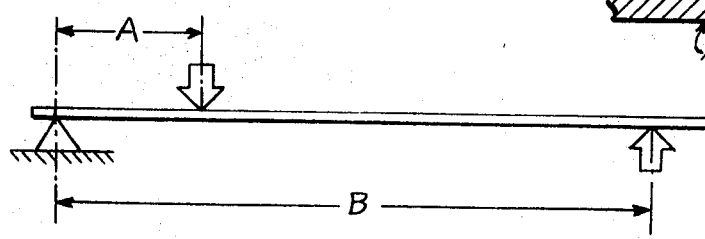

WEIGHT PLATFORM APPARATUS IN A WEIGHING MACHINE

BACKGROUND OF INVENTION

1. Field of Invention

Relates to improved platform type scales and weighing machines generally and particularly relates to the multiplying levers and weight transfer mechanisms in the load-receiving platform apparatus of a weighing machine and adjustment means for restoring the scale after use to provide for continued accurate response and to compensate for wear in use.

2. Description of the Prior Art

It is a problem of particular import in the design of platform type weighing machines to be able to obtain a same load effect of a same load irrespective of the position at which the load is placed on the load platform of a weighing machine. In attempts to resolve this problem, various weighing machines have been devised utilizing mechanical means in the form of multiplying levers or the like or by applying the principles of fluids and in the use of hydraulic or pneumatic load equalizing means. The typical platform mechanism of a weighing machine may include link-suspended levers, flexure plates and other complicated devices for actuating the weight counterbalancing and indicating means of a weighing machine. Such complicated platform mechanism is expensive to manufacture and market and is prone to malfunction particularly if the weighing machine parts are exposed to moisture or weather conditions and/or exposed to dirt, grime, or other foreign materials; a weighing machine may be particularly subject to inaccurate readings when it is installed in certain manufacturing or industrial areas and is exposed to various foreign matter or product waste particles. Another problem effecting the accuracy of a platform type scale is brought about by the dulling of the knife edge load pivot and fulcrum pivot lever supports in a weighing machine. This problem is particularly apparent in platform machines operative in weighing vehicular loads, as for example in the motor truck and railcar weighing platform scales. In such scales, there is heavy shock loads particularly brought about by horizontal shifting jolts caused by movement of a vehicle on the scale platform and in rapid stopping and starting of the vehicle. Such actions may rapidly wear the knife edge pivot structures of the scale apparatus and adversely effect the accuracy of the scale. To overcome such problems, the load pivot and fulcrum points of the lever mechanism in a scale may be overdesigned structurally to excess capacity. This may provide a more sturdy and durable scale construction but reduce substantially the sensitivity or range of accuracy of the scale. Also, since there is only minute vertical movement of the load platform in a typical platform scale, the use of weight transfer levers of long extension reduces substantially the accuracy of a particular scale. Another problem of prior art apparatus is the difficulty of adjustment and the relatively high initial cost of the scale.

SUMMARY OF THE INVENTION

The instant invention obviates many of the above-mentioned problems in prior art scale design and provides a load platform mechanism of uncomplicated design having minimum wear areas and parts subject to malfunction. The scale platform mechanism of the instant invention includes self-aligning or self-equalizing knife edge load pivot and fulcrum means which reduces substantially the wear at these areas and increases the accuracy of a weighing machine. Moreover, the particular form of the knife edge pivot means of the instant invention provides for more sturdy and durable structure at these points. This is particularly significant in the serviceability of platform type weighing machines designed for weighing motor vehicles or the like. The knife edge pivot structure is particularly serviceable in receiving the heavy shock loads transmitted to the platform structure by abrupt starting and stopping of motor vehicle loads. The load platform structure is less affected by moisture and weather conditions and by industrial product waste particles of dirt, grime or the like. The design of the load platform apparatus admits of the use of substantially short load transmitting levers which increase significantly the accuracy of a weighing apparatus. The load platform design admits of accurate uniform weight readings or indications irrespective of the positioning of the load on the load platform. The mechanically simple design and less complex mechanism of the invention is less costly initially than the prior art platform apparatus and permits economical manufacture and marketing; and after installation provides for inexpensive adjustment in the field.

BRIEF DESCRIPTION OF THE DRAWING

FIG. 3 is a vertical plane sectional view taken as on the line 3—3 of FIG. 1;

FIG. 4 is a vertical sectional view taken as on the line 4—4 of FIG. 1;

FIG. 5 is a vertical sectional view taken as on the line 5—5 of FIG. 1;

FIG. 6 is a vertical plane section taken as on the line 6—6 of FIG. 1;

FIG. 8 is a schematic showing of a second order lever arrangement utilized in the primary and secondary lever systems of the instant invention, with letter A representing the load arm extension and letter B representing the force arm extension.

DESCRIPTION OF THE PREFERRED EMBODIMENT

Figure 1:
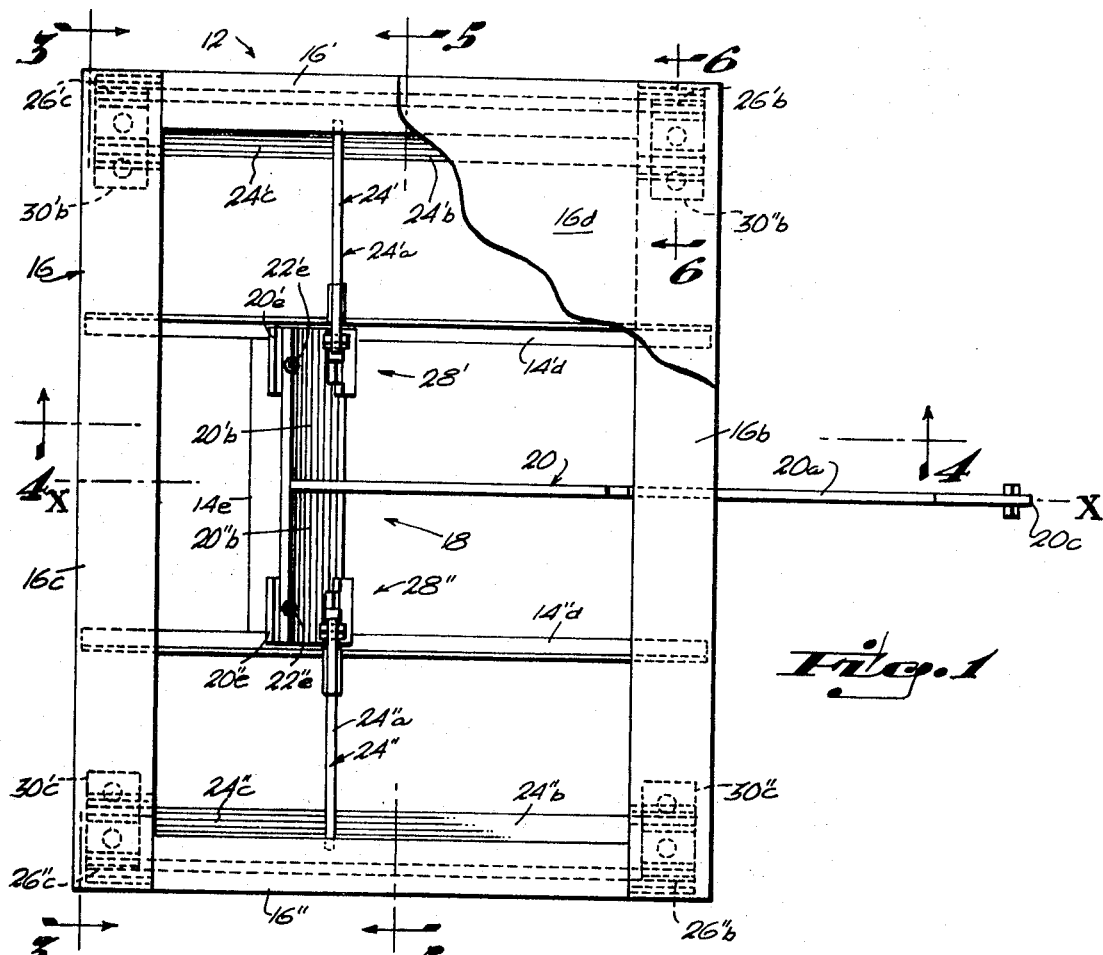
FIG. 1 is a top plan view of the weight platform apparatus of the instant invention with parts removed for purpose of clarity.

The weight platform apparatus of the instant invention is indicated by reference character 12 and adapted to be incorporated in a weighing machine (not shown) having weight counterbalancing and indicating means. The weight platform apparatus 12 basically includes a horizontal base frame 14, a horizontal load platform 16 adapted to support a load or weight W (see FIG. 2) and suspension means supporting the load platform 16 over the base frame 14 and including a primary lever construction 18 including a primary lever reach member 20 having a force arm extension 20a and left and right load arm projections 20'b, 20''b and left and right anchor block assemblies 22', 22''; a secondary lever system including a left lever reach member 24' including a force arm extension 24'a, oppositely projecting forward and rearward load arm projections 24'b, 24'c, and left forward and rearward anchor block assemblies 26'b, 26'c; a right secondary lever reach member 24'' including a force arm extension 24''a and forward and rearward load arm projections 24''b, 24'' c; left and right connector assemblies 28', 28'' connecting respectively the left and right secondary lever reach members 24', 24'' to the primary lever reach member 20; and, support pedestal units 30'b, 30'c, 30''b, 30''c arranged respectively at the four corners of the load platform structure 16 and between the secondary lever reach members 24', 24'' and the load platform.

The primary and secondary lever systems of the apparatus preferably are disposed symmetrically of a fore-and-aft extending vertical reference plane X—X (see FIG. 1) and with the force arm extension 20a of the primary lever reach member 20 extending horizontally and symmetrical of the reference plane. The distal portion 20c of the primary lever force arm extension 20a is adapted to be connected by suitable means to typical vertical link means (not shown) or other such linkage typically interconnecting the platform mechanism and the weight counterbalancing and indicating means of a scale or weighing machine.

Figure 2:
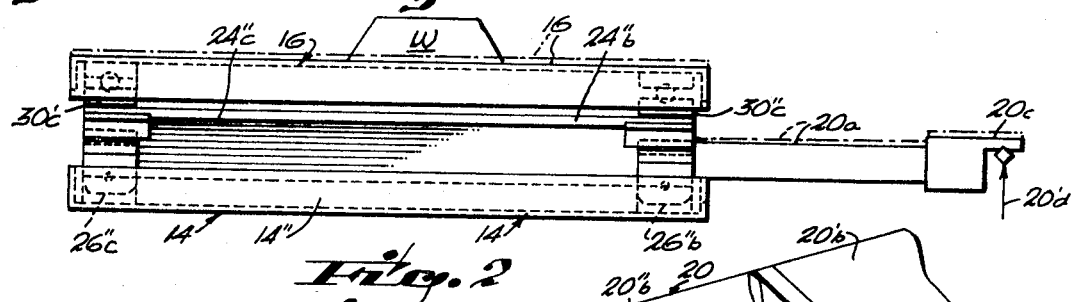
FIG. 2 is a side elevational view of the apparatus of FIG. 1.
Figure 7:
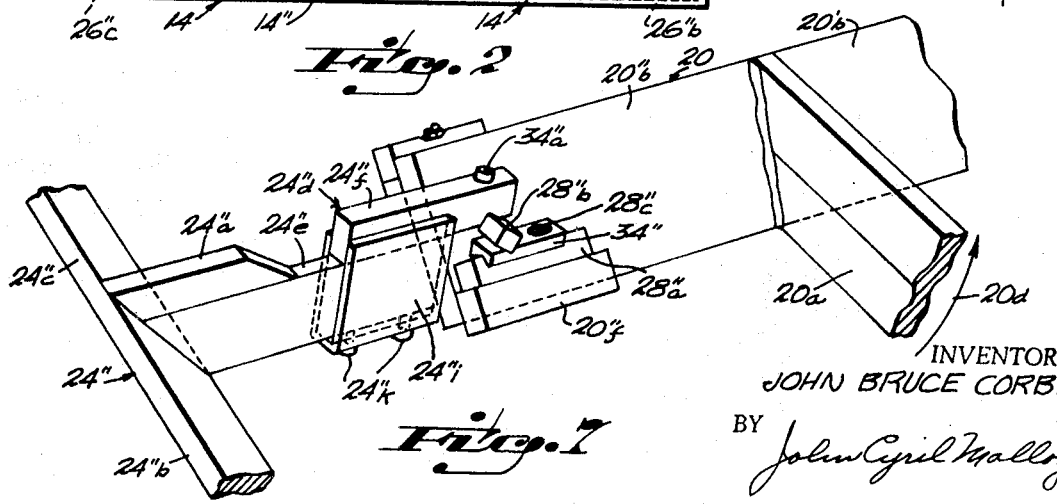
FIG. 7 is a perspective view of the right-hand connector assembly connecting the primary and secondary lever systems of the apparatus.

The force arm extension 20a of primary lever reach member 20 is urged upwardly in a direction indicated by force arrows 20d (see FIGS. 2 and 7) by the counterpoise or counterweight means of the weighing machine. FIG. 2 illustrates (in broken lines) the position of the load platform 16 and the primary lever force arm extension 20a when the weight platform apparatus 12 is in an inactive disposition and when the force arm extension 20a is urged upwardly under the influence of the weight counterbalancing means (not shown) of the weighing machine. The full line showing of the load platform 16 and the primary lever force arm 20a illustrates the disposition of the weight platform apparatus when the weight W is supported on the load platform.

The base frame 14 includes left, right, forward and rearward angle iron members respectively 14', 14'', 14b, 14c arranged in rectangular configuration; a pair of intermediate members 14'd, 14''d parallel fixedly spanning the forward and rearward frame members 14b, 14c; and a strap iron tie member 14e fixedly spanning the intermediate members 14'd, 14''d.

The load platform 16 preferably includes forward and rearward parallel arranged inverted channel members 16b, and 16c, left and right angle iron members 16', 16'' fixedly spanning channel members 16b, 16c and defining a rectangular load frame assembly 16', 16'', 16b, 16c, and preferably includes a load sheet 16d horizontally fixedly secured on the load frame assembly and adapted to directly supportingly engage the load or weight structure W.

The primary lever 20 preferably is of T-form. The left and right load arm projections 20'b, 20''b preferably are defined by a single rectangular plate iron perpendicularly fixedly secured at approximately a 45° inclination on the proximal portion of the primary lever force arm 20a. The pair of anchor block assemblies 22', 22'' fulcruming the primary lever reach member 20 are like configured and coactingly operative. The anchor block assembly 22' includes an anchor block element 22'a, an upright pair of bearing lugs 22'b, 22'b supported on base frame tie member 14e, and horizontal pin means 22'c rockably supporting the anchor block element 22'a between the pair of bearing lugs and permitting pivotal or rocking movement of the anchor block element generally in a plane of movement parallel to the fore-and-aft extending reference plane X—X. The right-hand anchor block assembly 22'' includes an anchor block element 22''a, bearing lug structure 22''b and pin means 22''c.

The primary lever fulcrum means further includes knife edge support means interposed between the respective anchor block elements 22'a, 22''a and the right and left load arm structure 20'b, 20''b of the primary lever reach 20. The left-hand knife edge support structure preferably includes a square sectioned knife bar element 22'd removably secured horizontally along the upper portion of the primary lever arm projections 20'b by vertical bolt means 22'e (see FIG. 4). An abutment bar 20'e horizontally fixedly secured to load arm projection 20'b defines downwardly oriented horizontally extending recess means receiving the knife bar element 22'd. The laterally canted knife bar 22'd defines a downwardly oriented knife edge resting on a trough bar 32'a turnably supported by vertical pin means 32'b on anchor block element 22'a.

The upwardly oriented longitudinal recess of the trough bar element 32'a receives the knife edge of bar 22'd; the pivotal movement of anchor block element 22'a about pin means 22'c permits the trough bar 32'a to assume a position square with the knife bar 22'd and to effect uniform load distribution between the knife bar and the trough bar. The vertical pin means 32'b preferably is arranged centrally of the trough bar 32'a and permits slight horizontal pivotal movement in aligning the bar recess with the knife edge intersection of the knife bar 22'd. The knife edge support structure of the right primary lever fulcrum means includes a knife bar 22''d, a trough bar 32''a and other parts, not specifically designated, corresponding with the knife edge support structure of the above-described left primary lever fulcrum structure.

The left and right secondary lever reach members 24' 24'' each are preferably of T-form and correspond somewhat with the T-configuration of the primary lever reach 20. The oppositely extending forward and rearward load arm projections 24'b, 24'c of left lever reach 24' preferably are formed of a single plate iron piece perpendicularly fixedly secured symmetrically on the proximal portion of the force arm 24'a. The plate iron structure defining load arm projections 24'b, 24'c, in like configuration with primary lever member 20 preferably is fixedly secured to the lever arm 24'a on a 45° inclination (See FIG. 3).

The left forward and left rearward fulcrum pivot means are alike and are coactingly simultaneously operative. The forward and rearward anchor block assemblies 26'b, 26'c (FIG. 1) fulcruming the left secondary lever reach member 24' correspond substantially with a respective anchor block assembly 22', 22'' of the fulcrum pivot means of the primary lever reach member 20 (compare the anchor block assembly 26'c shown in FIG. 3 with the anchor block assembly 22' shown in FIG. 4): left rearward anchor block assembly 26'c of the left secondary lever reach member 24' includes an anchor block element 26'd, a pair of bearing lugs 26'e supported on base frame 14 and pin means 26'f pivotally or rockably supporting the anchor block element between the bearing lugs and in a plane of movement lying perpendicular the fore-and-aft extending reference plane X—X. The knife edge support means of the left secondary lever projection 24'c includes a knife bar 26'g supported horizontally along the upper outer potion of the secondary reach member arm projections 24'c. An abutment bar 24'g longitudinally fixed on load arm projection 24'c defines an abutment and longitudinal recess means for receiving the knife bar 26'g fixedly secured by bolt means 26'h to the lever projection 24'c. A trough bar 32'c pivotally supported on the upper edge face of anchor block element 26'd by vertical pin means 32'd. The downwardly oriented edge of knife bar 26'g is ridingly received in the upwardly oriented recess of the trough bar 32'c and defines knife edge pivot means between the anchor block assembly 26'c and the left secondary lever arm projections 24'c.

The right secondary lever reach 24'' is coactingly operative with the left reach lever 24' and correspondingly includes forward and rearward fulcrum pivot means simultaneously pivotally supporting respectively the forward and rearward load arm projections 24''b, 24''c of the lever reach 24''. The anchor block assembly 26''c of the right rearward fulcrum pivot of the right secondary reach member 24'' includes an anchor block element 26''d, bearing lugs 26''e supported from base frame 14, and horizontal pin means 26''f rockably supporting the anchor block element in a vertical plane (see FIG. 3). It will be understood that the left forward and right forward fulcrum pivot means (not illustrated in detail) respectively of the left and right secondary reach members 24', 24'' are of form and function corresponding with respectively the above-described left rearward and right rearward fulcrum pivot means and associated anchor block assemblies 26'c, 26''c. The forward and rearward knife edge support means of the left secondary lever reach 24' defines a horizontal fulcrum pivot axis for the reach member 24'; likewise, the forward and rearward knife edge support means of the right secondary lever reach member 24'' defines the fulcrum pivot axis of the reach member 24''. The fulcrum pivot axes respectively of the left and right secondary lever reach members 24', 24'' are parallel arranged and preferably equidistantly spaced from the reference plane X—X and thus from the force arm 20a of the primary lever reach member 20 (see FIGS. 1 and 5).

The left and right connector assemblies 28', 28'' (see right connector assembly in FIG. 7) articulatingly connect respectively the left and right load pivot portions of the primary lever member 20 respectively with the force arm extensions 24'a, 24''a respectively of the left and right secondary lever members 24', 24''. The left and right connector assemblies 28', 28'' are alike in form and function and are operative generally in a vertical plane lying transversely of the reference plane X—X. Each connector assembly 28', 28'' preferably includes dual knife edge support means of crossed horizontal axes configuration: The right connector assembly 28'' includes a lower knife bar 28''a defining an upwardly oriented knife edge; an upper knife bar 28''b defining a downwardly oriented knife edge; and a spacer bearing bar 34'' interposed between the confronting crossed knife edge portions of the upper and lower knife bars and receiving converging stress forces of the primary and secondary lever reach members. The lower knife bar 28''a is received in upwardly oriented trough means defined by an abutment block 20''f horizontally fixed on the outer forward portion of the arm projection 20''b of the load arm of the right secondary lever member 20. Vertical bolt means 28''c extending diagonally respectively through the lever arm projection 20''b and the lower knife bar 28''a preferably provides means for removably securing the knife bar to the lever arm projection.

The upper knife bar 28''b is fixedly secured perpendicularly on the distal extremity of the force arm 24''a of the right secondary lever reach member 24''. The force arm 24''a preferably includes an adjustable extension unit 24''d supporting the upper knife bar 28''b on the secondary lever force arm projection 24''e (see FIG. 7). The extension unit 24''d includes a horizontal block element 24''f and a U-shape guide element 24''i fixedly secured to the extension block 24''f and defining a tubular hollow interior for receiving the force arm projection 24''e. A cap screw 34''a extends vertically through the distal end of extension block 24''f and is threaded diagonally centrally in the knife bar 28''b. The knife bar is firmly clamped in a transversely extending V-notch formed in the bottom distal portion of the extension block 24''f and defines knife edge means ridingly engaging the upper face surface of the spacer bearing bar 34''. Set screw elements 24''k extending vertically through the bight portion of the guide structure 24''i provides means for adjustably anchoring the extension unit 24''d at a selected isposition longitudinally on the force arm projection 24''e. The positioning of the extension unit 24''d permits adjustment of the knife edge bar 28''b longitudinally on the upper face surface of the spacer bearing bar 34''.

The spacer bar 34'' has longitudinally extending downwardly oriented recess structure correspondingly ridingly engaging the upwardly oriented knife edge portion of lower knife bar 28''a. A vertical bolt 28''c is secured diagonally in knife bar 28''a and has a head portion extending upwardly through an oversize opening in the spacer bearing bar 34''. The spacer bar is loosely secured superjacently on the knife bar 28''a and in such a manner permitting limited lateral rocking movement of the spacer bar and for uniformly engaging the upper face thereof with the downwardly oriented knife edge of upper bar 28''b.

The left connector assembly 28', corresponding with the right connector assembly 28'', includes dual knife edge support means including a lower knife bar 28'a, an upper knife bar 28'b, and spacer bar means 34' interposedly arranged between the upper and lower knife bar. Extension unit 24'd is adjustably fitted on the force arm projection 24'e of the left secondary reach member 24' and defines means for adjustably positioning the upper knife bar 28'b on the upper face surface of the spacer bearing bar 34'. A vertical bolt member 28'c extending diagonally through the left load arm projection 20'b of the primary lever reach structure 20 fixedly secures lower knife bar 28'a to the arm projection 20'b. The head portion of bolt 28'c projects upwardly through an oversize opening in bearing bar 34' and loosely supports the spacer bearing on the lower knife bar 28'a; the arrangement permits limited lateral movement of the spacer bar for uniformly engaging the upper knife bar. Set screws 24'k provide means for adjustably positioning the extension unit 24'd on the force arm projection 24'e and in adjustably positioning the upper knife bar 28'b relative to the spacer bearing bar 34'.

The support pedestal constructions including the pedestal units 30'b, 30'c, 30''b, 30''c support the load platform 16 and define respectively the load pivot axes for the left and right secondary lever reach members 24', 24''. The support pedestal units are alike in form and function. The left forward pedestal unit 30'b includes a generally T-shape body 36 having a horizontal upper portion 36a and vertical lower portion 36b, and knife edge support means 38 interposed between the pedestal body 36 and the load pivot portion of forward arm projection 24'b of the left secondary lever member 24'. The knife edge support means 38 preferably includes a knife bar 38a horizontally fixedly secured on lever arm projection 24'b by vertical bolt means 38b (see FIGS. 1, 4 and 6). An abutment bar 40 horizontally fixedly secured on the secondary arm projection 24'b provides trough means for receiving the knife bar 38a. The knife edge support means further includes a trough bar 42 having a longitudinal recess, and includes vertical pin means 46 turnably supporting the trough bar 42 on the bottom edge face of the pedestal body lower portion 36b.

The trough bar 42 is pivotally supported by pin means 46 generally in a horizontal plane of movement and with the longitudinal recess structure of the trough bar 42 being oriented downwardly and ridingly supported on the knife bar element 38. The pin means 46 preferably includes a tubular pin element 46a having a lower portion fixedly fitted in a central aperture 42a formed in trough bar 42, and having an upper portion freely turnably received in a vertical aperture 36c formed in the pedestal body lower portion 36b (see FIG. 6). The load or downward thrust on the pedestal body 36 is transmitted to the trough bar 42 along a horizontal plane of abutment indicated 48. The bolt head portion 38h of the bolt means 38b supporting knife bar 38 preferably protrudes upwardly and is received in the aperture 42a of trough bar 42. The arrangement permits the accurate positioning of the pedestal unit 30'b when the load platform 16 is displaced upwardly or lifted away from the base frame 14 or the remainder of the weighing apparatus.

Another feature useful in locating each pedestal unit on the weighing apparatus, and particularly useful in replacing the load platform 16 on the four pedestal units is that feature permitting each pedestal unit to be self-supporting substantially in a proper position for positioning the load platform 16: The weight distribution of each pedestal unit is offset outwardly and is arranged in a manner causing a support unit to be canted slightly outwardly to a disposition resting on a respective right or left secondary lever reach structure. For example, and with reference to FIG. 6, the upper extension of the horizontal portion 36a of the pedestal body 36 is heavier than that portion extending leftward of the body vertical portion 36b; such an arrangement causes the body 36 to be canted rightward when the load platform 16 is elevatingly displaced and permits the rightward extremity (as viewed in FIG. 6) of the body horizontal portion 36a to restingly engage the upper edge of the horizontal force arm projection 24'b of the left secondary lever 24'. A downwardly opening recess 36d preferably is formed in the upper horizontal portion 36a of the body 36; the threaded nut element 26'n of the knife bar bolt means 26'h is adapted to be received in the recess 36d when the pedestal unit 30'b is canted rightward when the load platform 16 is elevatingly displaced from the remainder of the weighing apparatus.

Each support pedestal construction includes antifriction bearing means interposed between the upper portion of the pedestal unit and the lower structure of the load platform means 16. Again with reference to the left forward support pedestal construction and the pedestal unit 30'b (FIG. 6) the antifriction bearing means includes two ball bearing elements 52 received respectively between upper and lower circular depressions 54a, 54b formed respectively in the platform structure 16 and the pedestal body upper portion 36a (see FIGS. 4 and 6). A bearing block 56, defining the upper depressions 54a for the bearings 52, is fixedly secured by bolt means 58 in the channel iron structure 14b of the base frame 14 (see FIGS. 1 and 4). The arrangement of the ball bearing elements 52 and the upper and lower cups or depressions 54a, 54b provides antifriction means permitting freedom of horizontal movement of the load platform structure 16 and self-centering restoring action of the platform under the influence of gravity: The ball bearing elements 52, tending to seek the bottoms of the upper and lower circular depressions 54a, 54b causes the platform 16 to be horizontally positioned relative to the base frame of the weighing apparatus. Shim strip means 60 preferably are fitted under the respective knife bar elements (FIG. 6) and provide means for equalizing the load on the support pedestal constructions and for trimming and equalizing the load stresses in the platform suspension means of the weighing apparatus.

In the operation of the weight platform apparatus, and in an idle or no-load condition, the primary lever force arm distal portion 20c is urged upwardly under the influence of the weight counterbalancing and indicating means (not shown): the primary lever 20 is pivoted slightly upwardly about the knife edge fulcrum structure, upwardly pivoting the left and right load arm projections 20'b, 20''b, and through action of the connector assemblies 28', 28'', the respective force arms 24'a, 24''a respectively of the left and right secondary lever reach members 24', 24'' are pivotally moved upward. Simultaneous upward movement of the connector assemblies 28', 28'' pivotally urges the left and right secondary levers upwardly oppositely respectively about the left forward and rearward, and right forward and rearward pivot axes, and such action simultaneously equidistanly lifts respectively the support pedestal units 30'b, 30'c, 30''b, 30''c. Upward movement of the support pedestal units, operative through the antifriction ball bearing elements 52 raises the load platform 16. Conversely, when a load or weight W is placed on the platform 16, the above-described forces and actions occur oppositely, moving the force arm 20a of the primary lever downwardly and to a static disposition whereat the weight and counterbalancing forces are balanced.

It will be noted that by reason of this structure, the distance between the pivots shown in FIG. 6 may be adjusted laterally by movement of translation only, that is to the left or right, by changing one of the left-hand or right-hand shims 60 to the opposite side of the knife edge support means 38. This movement does not angularly change the knife edge support means 38 but shifts it left or right. This movement is independent of vertical adjustment which can be achieved by changing the number of shims on both sides in an equal amount, for instance, by adding two to the left and two to the right. The same adjustment feature applies to all of the knife edges of the apparatus. The importance of this feature of adjustment is that, as the knife edges wear in use, the scale can be adjusted independently at each corner to restore all critical areas of the lever system into an orientation favorable for sensitive and accurate response to loads to be weighed.

Although the present invention is shown and described in a preferred embodiment it will be understood that various changes and modifications may be made without departing from the spirit and scope of the invention.

What is claimed is:

1. Weight platform apparatus in a weighing machine having weight counterbalancing and indicating means comprising:
   A. a broad base means,
   B. a broad load platform means,
   C. suspension means operatively supporting the platform means over the base means including
      1. compound lever means including
         a. a primary second order lever system including
            1. a primary lever construction including
               a. a primary lever reach
                  1. extending correspondingly and generally symmetrically of a vertical reference plane extending fore-and-aft of said weight platform apparatus,
               b. left and right primary fulcrum means supported on said base structure,
                  1. arranged respectively leftward rightward of said reference plane and
                  2. fulcruming the load arm proximal portion of said primary lever reach,
         b. a secondary second order lever system including
            1. a left secondary lever construction arranged leftward of said reference plane including
               a. a left secondary lever reach,
               b. left forward and rearward fulcrum pivot means fulcruming the load arm proximal portion of said left secondary lever reach in arced movement generally perpendicular to said reference plane,
            2. a right secondary lever construction arranged rightward of said reference plane including
               a. a right secondary lever reach,
               b. right forward and rearward fulcrum pivot means fulcruming the load arm proximal portion of said right secondary lever reach in pivotal arced movement generally perpendicular to said reference plane,
      c. means operably connecting said primary and secondary lever systems including
         1. left connector means articulatingly connecting the left load pivot portions of said primary lever reach with the force arm distal portions respectively of said left secondary lever reach,
         2. right connector means articulatingly connecting the right load pivot portions of said primary lever reach with the force arm distal portions respectively of said right secondary lever reach
      2. left and right forward and rearward support pedestal constructions
         a. each interposedly arranged respectively between the left and right secondary lever reach members and said load platform means,
         b. each support pedestal construction including
            1. upper structure engaging the load platform means and
            2. lower structure engaging a load pivot portion respectively of said left and right secondary lever reach members, and
   D. means adapted for operably connecting the force arm distal portion of said primary lever reach with the weight counterbalancing and indicating means of a weighing machine.
   E. Knife edge lever support means
   F. adjustment shim strip means selectively interposed between said base means and said load platform means for equalizing the load on said support pedestal constructions and for trimming and equalizing load stresses in the compound lever means of the apparatus.

2. A weight platform apparatus as set forth in claim 1 wherein each fulcrum means of the left and right fulcrum means of said primary lever system includes
   a. an anchor block assembly including
      1. an anchor block element,
      2. means turnably rockably supporting said anchor block element from said base means generally in a plane of movement perpendicular to said fore-and-aft extending vertical reference plane, and includes
   b. knife edge support means
      1. interposed between said anchor block element and a respective load arm proximal portion of said primary lever reach member and
      2. extending in a direction generally perpendicular to said vertical reference plane.

3. A weight platform apparatus as set forth in claim 2 wherein said means rockably supporting said anchor block element includes
   a. pin means pivotally turnably supporting said block element in a plane of movement perpendicular to said reference plane.

4. A weight platform apparatus as set forth in claim 3 wherein said knife edge support means includes
   a. trough bar means including
      1. a trough bar element having a longitudinal recess,
      2. vertical pin means turnably supporting said bar element with said recess being oriented upwardly and extending in a vertical plane lying generally perpendicular to a vertical plane coincident with the horizontal axis of the pin means supporting said block element, and b. knife bar means including
1. a knife bar element fixedly supported on a respective load arm proximal portion of said primary lever reach member and having
2. downwardly oriented knife edge structure ridingly supported in the longitudinal recess of said trough bar element.

5. A weight platform apparatus as set forth in claim 1 wherein each fulcrum means of the left and right secondary lever reach members of said secondary lever system includes
a. an anchor block assembly including
1. an anchor block element
2. means turnably rockably supporting said anchor block element from said base means generally in a plane of movement lying parallel to the fore-and-aft extending vertical reference plane,
b. knife edge support means
1. interposed between said anchor block element and a respective load arm proximal portion of said secondary lever reach member of the left and right reach members.

6. A weight platform apparatus as set forth in claim 5 wherein said knife edge support means of said secondary lever system includes
a. trough bar means including
1. a trough bar element having a longitudinal recess
2. vertical pin means turnably supporting said bar element on said anchor block element and in a horizontal plane of movement lying generally perpendicular to the vertical plane of movement of said anchor block element, and
b. knife bar means including
1. a knife bar element fixedly supported on a respective load arm proximal portion of a respective secondary lever reach member and having
2. knife edge structure ridingly supported in the longitudinal recess of said trough bar element.

7. A weight platform apparatus as set forth in claim 6 wherein
a. the knife edge support means of the left forward and rearward fulcrum pivot means of said left secondary lever reach member are generally coaxially arranged and supported on an axis lying parallel the fore-and-aft extending reference plane of the platform apparatus, and
b. the knife edge support means of the right forward and rearward fulcrum pivot means of said right secondary lever reach member are generally coaxially arranged and supported on an axis lying parallel said reference plane.

8. A weight platform apparatus as set forth in claim 7 wherein said left forward and rearward fulcrum pivot means and right forward and rearward fulcrum pivot means are symmetrically arranged relatively to said reference plane and equidistantly spaced therefrom.

9. A weight platform apparatus as set forth in claim 1 wherein said knife edge support means of each support pedestal construction includes
a. knife bar means fixedly supported on a respective load arm distal portion of a respective secondary reach lever member and having upwardly oriented knife edge structure, and
b. trough means including
1. a trough bar element having a longitudinal recess,
2. vertical pin means turnably supporting said bar element on a pedestal body, in a generally horizontal plane of movement, and with said longitudinal recess structure being oriented downwardly and ridingly supported on the knife edge structure of said knife bar means.

10. A weight platform apparatus as set forth in claim 1 wherein said right and left connector means articulatingly connecting the primary and secondary lever systems includes respectively
a. a left connector assembly disposed generally contiguous a vertical plane adjacent and parallel a plane of movement of said left secondary lever reach member, and including
1. dual knife edge support means of crossed horizontal axes configuration,
b. a right connector assembly disposed generally contiguous a vertical plane adjacent and parallel a plane of movement of said right secondary reach member, and including
1. dual knife edge support means of crossed horizontal axes configuration.

11. A weight platform apparatus as set forth in claim 10 wherein each connector assembly includes
1. a lower knife bar fixedly supported on said primary lever reach member adjacent a load arm distal portion thereof and defining an upwardly oriented knife edge extending perpendicular to a plane of movement of said primary lever reach member,
2. an upper knife bar fixedly supported on the force arm distal portion of a respective secondary lever reach member and defining a downwardly oriented knife edge extending perpendicular to a plane of movement of the respective secondary lever reach member, and includes
3. spacer bearing means interposed between the confronting knife edge portions of said upper and lower knife bar elements and operatively receiving converging stress forces of the respective primary and secondary lever reach members.

12. A weight platform apparatus as set forth in claim 11 wherein said spacer bearing means of each connector assembly includes
1. a spacer bearing bar having a longitudinally extending recess, and
2. means loosely horizontally securing said spacer bearing bar to said lower knife bar element with the knife edge portion of said lower knife bar being received in the recess of said spacer bar and permitting limited lateral rocking movement of said spacer bar relative to said lower knife bar.

* * * * *